(12) United States Patent
Tinker

(10) Patent No.: US 8,281,817 B2
(45) Date of Patent: Oct. 9, 2012

(54) LAMINAR FLOW TOOL

(75) Inventor: Donald W. Tinker, Rapid City, MI (US)

(73) Assignee: Team Oil Tools, LP, Tulsa, OK (US)

( * ) Notice: Subject to any disclaimer, the term of this patent is extended or adjusted under 35 U.S.C. 154(b) by 220 days.

(21) Appl. No.: 12/613,711

(22) Filed: Nov. 6, 2009

(65) Prior Publication Data

US 2010/0132937 A1  Jun. 3, 2010

Related U.S. Application Data

(60) Provisional application No. 61/111,784, filed on Nov. 6, 2008.

(51) Int. Cl.
*F15D 1/04* (2006.01)
*B01F 15/00* (2006.01)

(52) U.S. Cl. ........ 138/39; 366/175.2; 366/339; 166/386

(58) Field of Classification Search ............. 166/386, 166/91.1; 175/339, 231; 137/838, 839; 138/37, 138/39, 44; 366/336, 339, 174.1, 175.2
See application file for complete search history.

(56) References Cited

U.S. PATENT DOCUMENTS

| | | | | |
|---|---|---|---|---|
| 818,891 A * | 4/1906 | Jones et al. | | 165/113 |
| 1,974,110 A * | 9/1934 | Higley | | 138/39 |
| 2,210,031 A * | 8/1940 | Greene | | 62/117 |
| 3,582,045 A * | 6/1971 | Leybourne, III | | 366/339 |
| 3,746,126 A * | 7/1973 | de Cardenas | | 181/227 |
| 4,386,653 A * | 6/1983 | Drake | | 166/105 |
| 4,641,705 A * | 2/1987 | Gorman | | 165/85 |
| 6,026,845 A * | 2/2000 | Walrath et al. | | 137/360 |
| 6,557,576 B2 * | 5/2003 | Walrath et al. | | 137/14 |
| 2007/0017243 A1 * | 1/2007 | Kidwell et al. | | 62/260 |

* cited by examiner

*Primary Examiner* — Shane Bomar
*Assistant Examiner* — Catherine Loikith
(74) *Attorney, Agent, or Firm* — Lee, Jorgensen, Pyle & Kewalramani, PC

(57) ABSTRACT

A laminar flow tool is for channeling water, air or other fluids through a down drill pipe or tubing for pressurization of other tools or other purposes. The tool provides a flow divider having an 180 degree twist separating a driven fluid chamber from a buffer fluid pocket. Fluid in the tool is calmed as it travels and loses some of the spin ("turbulence") inherent in the water or other fluid. A buffer pocket on one side absorbs shocks and stabilizes the driven side. Ports in the buffer side help equalize pressure.

6 Claims, 1 Drawing Sheet

LAMINAR FLOW TOOL

CROSS REFERENCE TO RELATED APPLICATIONS

This application claims the benefit of U.S. Provisional Application 61/111,784, filed Nov. 6, 2008, entitled Laminar Flow Tool, which is incorporated herein by reference.

BACKGROUND OF THE INVENTION

1. Field of the Invention

The present application relates to a method and apparatus for decreasing turbulence and cavitation in a closed conduit.

2. Description of the Prior Art

The volume of flow through a down hole tool determines in part the cost effectiveness of using that tool or tubing for production or other operation on a well. Cavitation, knocking or other non-laminar flow can force the reduction in flow rate through a tubing or tool thereby extending the amount of time an operation may take. This may substantially increase the costs associated. Additionally, when used upstream of a mud motor or similar device, the non-laminar flow can cause substantial reductions in the fluid pressure provided to the mud motor impacting the motor's efficiency.

A laminar flow tool is thus envisioned that channels water, air or other fluids through a down drill pipe or tubing for pressurization of other tools or other purposes. For example, water may be piped to pressurize a mud motor. Because of the limited space in the tool passageway 16 and the pressure of the water, cavitation or turbulence may occur in the tubing causing knocking or other non-laminar flow problems which can reduce the amount and/or pressure of water reaching the driven mud motor. Water naturally carries pockets of air which may exacerbate these problems throughout the tool and other tubing reducing the efficiency of the pumped fluids.

The tool thus provides a flow divider having an 180 degree twist separating a driven fluid chamber from a buffer fluid pocket. Fluid in the tool is calmed as it travels and loses some of the spin ("turbulence") inherent in the water or other fluid. Additionally, by imparting some motion to the water, the new direction will tend to unify the direction of all components of the driven fluid by moving them all in a new direction which will tend to impart a partial vortex motion on the fluids minimizing the effect of any independently directed fluids ("eddies" or other turbulent pockets). A buffer pocket on one side absorbs shocks and stabilizes the driven side. Ports in the buffer side help equalize pressure.

None of the above inventions and patents, taken either singly or in combination, is seen to describe the instant invention as claimed.

SUMMARY OF THE INVENTION

Accordingly, it is a principal object of a preferred embodiment of the invention to provide a laminar flow tool that can be provided in a sleeve, pipe, casing or tubing.

It is another object of the invention to provide a sleeve having a twisted flow divider for calming fluid in the sleeve and in components connected thereto.

Still another object of the invention is to provide a flow divider having a twist in the middle to calm fluid dividing flow through a sleeve into a driving fluid and buffer fluid pocket.

It is a further object of the invention to provide a flow divider having a pressure reduction port in the buffer fluid pocket for allowing a limited amount of fluid on one side to exit to equalize pressure across the divider.

It is an object of the invention to provide improved elements and arrangements thereof in an apparatus for the purposes described which is inexpensive, dependable and fully effective in accomplishing its intended purposes.

These and other objects of the present invention will be readily apparent upon review of the following detailed description of the invention and the accompanying drawings. These objects of the present invention are not exhaustive and are not to be construed as limiting the scope of the claimed invention. Further, it must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

BRIEF DESCRIPTION OF THE DRAWINGS

Similar reference characters denote corresponding features consistently throughout the attached drawings.

Detailed Description of the Preferred Embodiment(s)

The present application is to a method and apparatus for decreasing turbulence and cavitation in a closed conduit.

Figure 1:
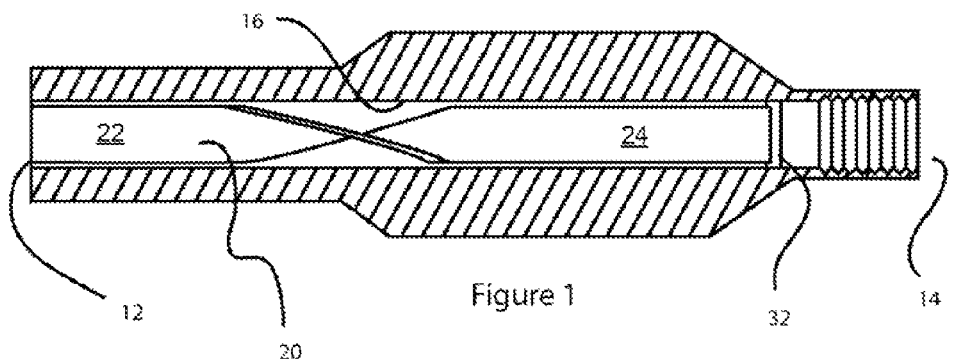
FIG. 1 is a diagrammatic, partial cross-section of a tool according to a preferred embodiment of the invention.

FIG. 1 shows a tool 10 used in directional and horizontal drilling incorporating one aspect of the current invention. One skilled in the art would appreciate that the tenets of the invention could be used to improve other drilling related devices or non-drilling devices, including other high pressure closed conduits such as piping, radiators, plumbing, etc.

The particular tool shown improved by the current invention channels water, air or other fluids through a down drill pipe or tubing for pressurization of other tools or other purposes. For example, water may be piped from the inlet 12 to the exit 14 to pressurize a mud motor for driving other sequential tools. Because of the limited space in the tool passageway 16 and the pressure of the water, cavitation or turbulence may occur in the tubing causing knocking or other non-laminar flow problems which can reduce the amount and/or pressure of water reaching the driven mud motor. Water naturally carries pockets of air which may exacerbate these problems throughout the tool and other tubing reducing the efficiency of the pumped fluids.

One advantage of the present invention is a way to reduce cavitation or turbulence or its effects in the tooling. A flow divider 20 is provided within the tool to carry water or other fluids ("driven fluids") to a downstream component such as a mud motor. By providing a twist of 180 degrees the fluid is calmed as it travels and loses some of the spin ("turbulence") inherent in the water or other fluid. Additionally, by imparting some motion to the water, the new direction will tend to unify the direction of all components of the driven fluid by moving them all in a new direction which will tend to impart a partial vortex motion on the fluids minimizing the effect of any independently directed fluids ("eddies" or other turbulent pockets). By providing a more uniform direction of travel to all of the fluid, the amount of turbulence will be reduced, resulting in a more laminar flow. One skilled in the art would recognize that the amount of twist in the tube may be increase or decrease by taking into consideration other factors such as flow rate, pressure, length of travel, etc. The twist may be as little as 45 degrees or may be 360 degrees or more. Additionally twists may be provided at various intervals to compensate for turbulence naturally incurred during travel along tubing or drill pipe or to compensate for additionally added fluid flows, if necessary.

Additionally by allowing the opposite side of the divider to fill with water leaking past the divider (or from introduction of water at an upstream or downstream location), the slower moving water on the non-driving side acts as a buffer or as a cushion to absorb pressure pulses in the water and to allow expansion of water on the driven side during turbulence-induced pressure waves in the driving fluids. The end of the divider closest to exit 14 preferably cooperates with the walls of the tool to provide a substantially closed chamber for the buffer fluid so that flow in the buffer chamber is substantially reduced.

Figure 2:
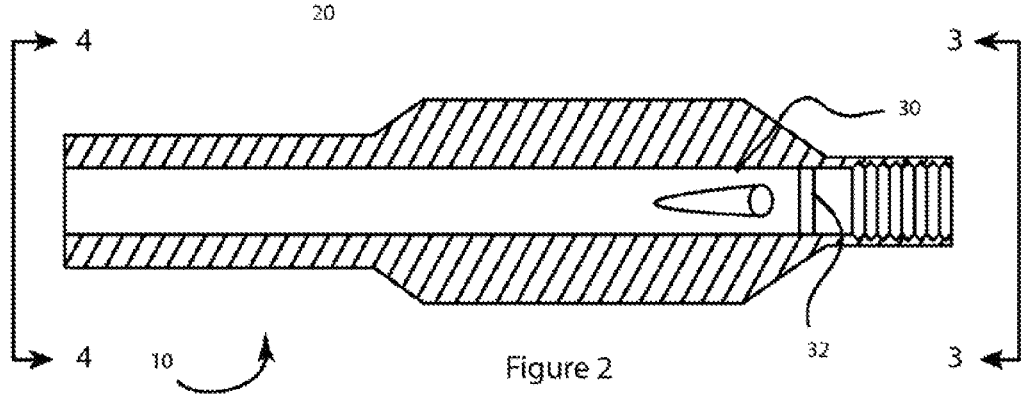
FIG. 2 is a diagrammatic, partial cross-section of a tool according to a preferred embodiment of the invention with the center flow divider removed.
Figures 3, 4:
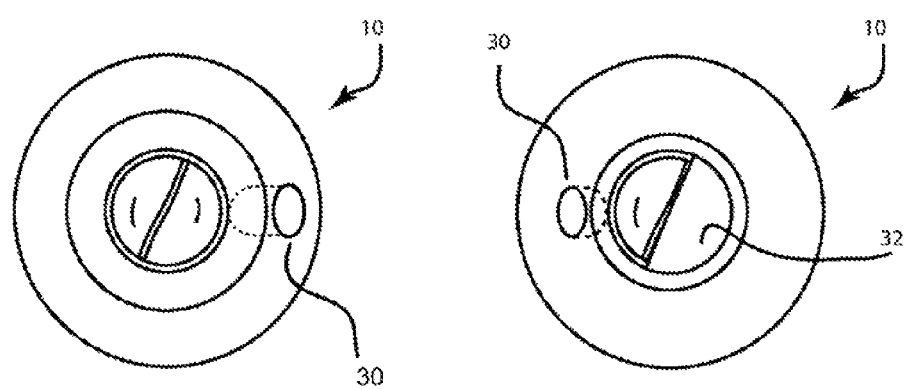
FIG. 3 is a diagrammatic view of the exit of a tool according to a preferred embodiment of the invention including a buffer cover plate.
FIG. 4 is a diagrammatic view of the inlet to a tool according to a preferred embodiment of the invention.

Preferably, the twist insert does not extend the entire length of tubing or drill pipe, but instead is only provided near the end of the tubing. Water or other fluid piped into the tool will travel on either side of the twist. Water on the driving side will easily continue onto the next sequential tool, such as a mud motor. Water entering the buffer side will be limited to the volume of the buffer chamber and prevented from freely flowing as the driven side does by a flow restrictor or plate 32 (FIGS. 2 & 3) which covers substantially only the end of the buffer side. The buffer chamber 24 may be smaller or larger than the driving fluid chamber 22.

One or more exit holes 30 are provided for the reasons below. The holes are preferably configured and sized to allow a limited amount of fluid to escape such that the overall pressure of the fluid in the driven side is not substantially reduced, while allowing the buffer to operate in the intended manner.

The exit holes 30 on the non-driving side (shown in FIG. 2 with the divider removed for clarity) allow for water to leak out of the tool to regulate pressure and volume of fluids in the buffer water side. The pressure outlet provided by the exit hole allow for over-pressure releases during continued pressure increases on the driven side of the hole. The material used in the divider can be selected to control the amount of pressure transfer from the driven side to the non-driven side. Namely, a stiff material tightly engaging the inner walls of the tool will limit pressure transfer, whereas a more flexible or flaccid material with more space between the tool and the wall will allow for more expansion and contraction of the driven chamber. It should be noted also that the water in the buffer side will also help maintain the shape and the integrity of the divider and the twist by providing pressure on the back side of the divider to resist pressures of the driven fluids.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as maybe applied to the central features hereinbefore set forth, and fall within the scope of the invention and the limits of the appended claims. It is therefore to be understood that the present invention is not limited to the sole embodiment described above, but encompasses any and all embodiments within the scope of the following claims.

I claim:

1. A laminar flow tool, comprising:
   a central sleeve having a housing defining an inlet and an outlet and defining a central bore connecting said inlet and outlet for receiving a fluid flow therethrough;
   a central divider dividing said central bore into a driving fluid chamber and a buffer chamber;
   said central divider formed by an elongated sheet having a twist about its elongated axis at least 45 degrees to impart a rotational component to fluid flowing through said driving fluid chamber;
   a buffer flow diverter provided downstream of said buffer chamber and cooperating with said central divider to provide smaller outlet to said buffer chamber than an outlet of said driving fluid chamber.

2. The laminar flow tool according to claim 1, wherein said elongated sheet has a 180 degree twist.

3. The laminar flow tool according to claim 1, wherein said elongated sheet has at least a 180 degree twist.

4. The laminar flow tool according to claim 1, wherein said elongated sheet has at least a 360 degree twist.

5. The laminar flow tool according to claim 1, wherein said buffer flow diverter cooperates with said central divider to provide no downstream fluid from said buffer chamber into said central sleeve outlet.

6. The laminar flow tool according to claim 1, wherein said buffer chamber includes a fluid pressure relief port from said buffer chamber through central sleeve housing to an area radially outward from said central sleeve to reduce fluid pressure in said buffer chamber.

* * * * *